Patented Aug. 30, 1932

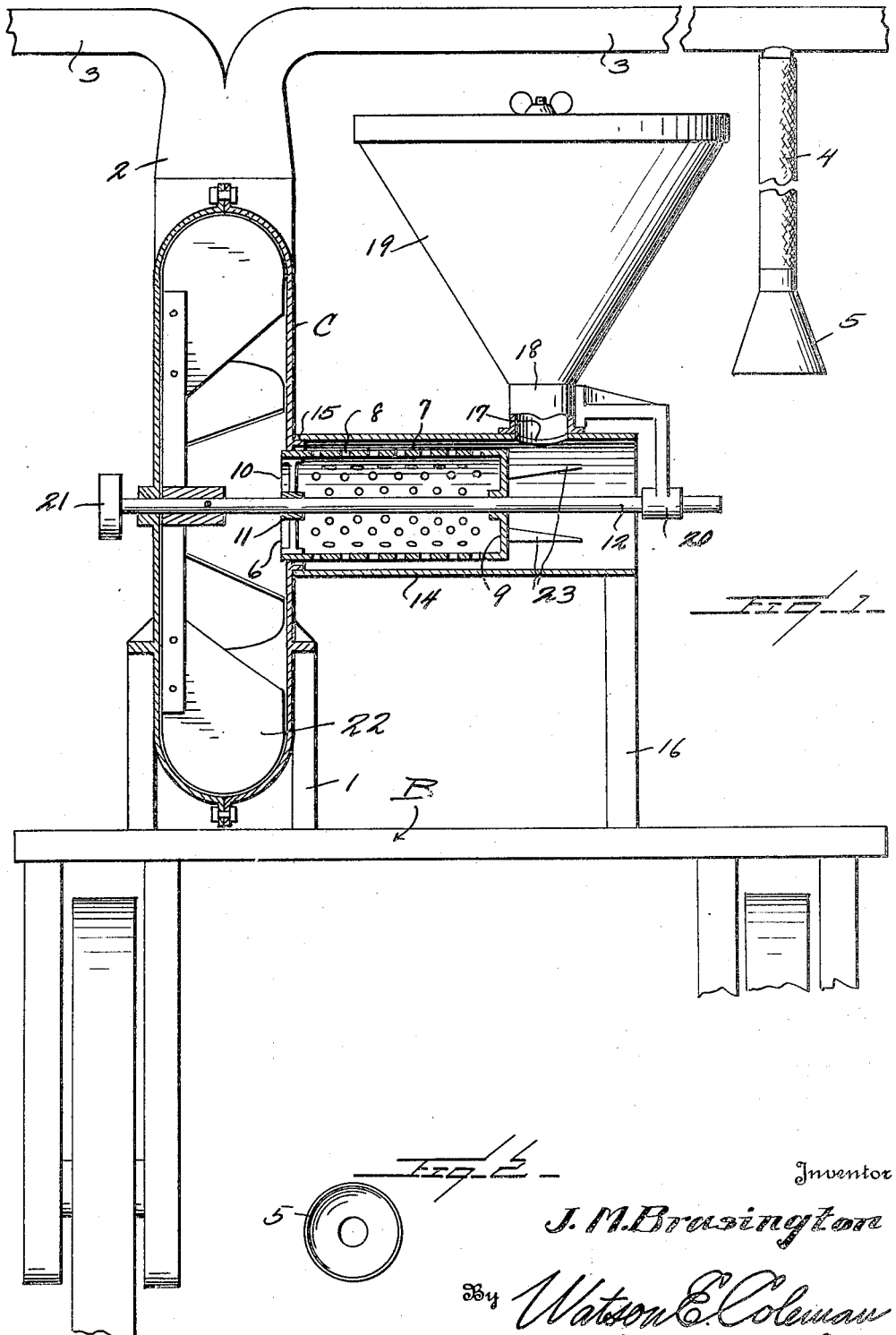

1,873,993

UNITED STATES PATENT OFFICE

JOHN M. BRASINGTON, OF CHERAW, SOUTH CAROLINA, ASSIGNOR OF ONE-HALF TO CHARLES S. McCALL, OF BENNETTSVILLE, SOUTH CAROLINA

DUSTING APPARATUS

Application filed October 15, 1929. Serial No. 399,843.

This invention relates to a dusting apparatus and has relation more particularly to an apparatus of this kind especially designed and adapted for use in applying powdered insecticide to cotton plants and the like, and it is an object of the invention to provide an apparatus of this character with means to assure the material at the time of discharge being thoroughly comminuted to free the same of any flaky or kindred condition.

The invention also has for an object to provide a device of this kind including means for effectively comminuting the material after the same has been taken from the source of supply and also wherein such action is materially facilitated by the flow of the air into the casing of the distributing fan.

The invention consists in the details of construction and in the combination and arrangement of the several parts of my improved dusting apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a diagrammatic view partly in section and partly in elevation illustrating an apparatus constructed in accordance with an embodiment of my invention;

Figure 2 is a view in end elevation of the preferred type of nozzle for use in connection with my apparatus.

As disclosed in the accompanying drawing, B denotes a portable body adapted to be transported in any desired manner along a row of plants. Operatively supported by the body B, through the medium of the uprights 1 or otherwise as may be preferred, is a fan casing C of desired dimensions and which discharges in a conventional manner within a manifold 2. This manifold 2, as herein disclosed, has leading therefrom a series of pipe lines 3 directed and supported as may be preferred. Each of these lines has in communication therewith one or more tubes 4, preferably flexible, and each of said tubes is provided at its outer end with a nozzle 5. This nozzle 5 is preferably substantially conical in form and which structure is of advantage as the air with its load is discharged therethrough will be softened so that the load, which is effectively comminuted, will only be projected a short distance beyond the nozzle, thus assuring effective application of the material upon the foliage of the plants. By softening, I wish to be understood that the force of the discharge of the comminuted material is materially reduced in order to assure the proper lodgment of the material on the plants.

A face or side wall of the casing C at its central portion is provided with a conventional inlet opening 6 in which closely extends an end portion of a cylindrical tubular body 7, the peripheral wall of which being provided therealong and therearound with a series of small perforations 8.

The outer end of the member or body 7 is closed by a head 9 while the opposite end is open. Fixed within the open end portion of the member or body 7 is a spider 10 including a central collar 11 fixed to the fan shaft 12. This shaft 12 extends axially through the member 7 and the central portion of the head 9 of the member 7 is also fixed to said shaft. This mounting of the member or body 7 results in said member or body rotating with the shaft 12 at the same axial speed.

The extended portion of the member or body 7 is surrounded by an elongated tubular casing 14, preferably cylindrical, and one end of which being operatively supported, as at 15, by a side or face wall of the casing C, the outer end portion of this casing 14, as herein disclosed, being supported upon the body B by an upright 16 although, if desired, other means may be employed.

The casing 14 is of a length to terminate a desired distance beyond the outer or closed end of the member or body 7. The upper portion of the wall of this casing 14 at a point beyond the outer or closed end of the member 7 is provided with an inlet opening 17. This opening 17 is directly in communication with the discharge nozzle 18 depending from a supply hopper 19. This hopper 19 is herein set forth as being mounted upon the casing 14 but it may be otherwise held in desired position as preferred. This hopper 19 is adapted to contain a supply of insecticide, such as calcium-arsenate.

The fan shaft 12 is extended through the casing 14 and terminates outwardly of the open end of said casing for operative engagement with a bearing 20, herein set forth as being carried by the nozzle 18 of the hopper 19. The opposite end portion of the shaft 12 is rotatably supported by the outer side or face wall of the casing C and projects therebeyond.

This second projected end portion of the shaft 12 carries a pulley 21 adapted to be connected with any desired source of power for rotating the shaft 12 at desired speed. Fixed to the shaft 12 for rotation therewith within the casing C are the conventional fan blades 22.

The head 9 has extending therefrom in general direction of the shaft 12 a plurality of fingers 23, each of which being of a length to extend beyond the inlet opening 17.

With my improved apparatus in use, the action of the fan blades 22 results in the drawing into the casing 14 through the outer open end thereof a current of air and which air as it passes inwardly of said casing 14 carries therewith a material delivered within the casing 14 from the hopper 19 through the inlet opening 17. As the material is initially received within the casing 14 through the opening 17 the action of the fingers 23 is such to thoroughly break up and comminute such material and which action is further assured as the material passes with the air through the perforations 8 in the periphery of the member 7 so that when the material is received within the fan casing and carried off out through the pipe lines 3, such material will be free of any flaky or similar condition and thus assure the material being applied to the plants as a dust.

It is to be noted that the shaft 12 is disposed substantially at right angles to the axis of the nozzle 18 so that the fingers 23, which revolve with the axle 12 as an axis, move in a direction to intersect the flow of the material from the nozzle 18 resulting in the fingers having such action upon the material to effectively break up the same and at the same time to scatter the material within the casing 14 to assure the highly effective carrying of such material along with the air drawn through the casing 14 by the fan blades 22. In other words, in their operation the fingers 23 rotate in a path at right angles to the axis of the nozzle 18, thus assuring the most effective action upon the material flowing into the casing 14 and also flowing such material with a certain degree of centrifugal force to materially facilitate the passage of the material with air through the perforations 8 into the tubular body 7. This action of the fingers 23 with respect to the material is what may be termed "relatively free" as such action of the fingers 23 upon the material within the casing 14 is such as to avoid any resultant packing or flaking of the material but, on the contrary, has a tendency to break up any such conditions.

From the foregoing description it is thought to be obvious that a dusting apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus of the class described comprising, in combination, a distributing fan including a casing, a supply hopper, a tubular member in communication with both the casing and the hopper, said tubular member at a point beyond its communication with the hopper being in communication with the atmosphere, a second tubular member rotating within the first named tubular member, said tubular member having one end portion extending within the fan casing and its opposite end portion terminating at a point between the fan casing and the communication of the hopper with the first tubular member, the peripheral wall of said second tubular member being provided with openings, the outer end of said second tubular member being closed.

2. An apparatus of the class described comprising, in combination, a distributing fan including a casing, a supply hopper, a tubular member in communication with both the casing and the hopper, said tubular member at a point beyond its communication with the hopper being in communication with the atmosphere, a second tubular member rotating within the first named tubular member, said tubular member having one end portion extending within the fan casing and its opposite end portion terminating at a point between the fan casing and the communication of the hopper with the first tubular member, the peripheral wall of said second tubular member being provided with openings, the outer end of said second tubular member being closed, and outstanding fingers carried by the closed end of the second tubular member and revolving therewith for breaking action upon the material as it enters the first tubular member from the hopper.

3. An apparatus of the class described comprising, in combination, a distributing fan including a casing, a supply hopper, a tubular member in communication with both the casing and the hopper, said tubular member at a point beyond its communication with the hopper being in communication with the atmosphere, a second tubular member rotating within the first named tubular member, said tubular member having one end portion extending within the fan casing and its opposite end portion terminating at a point between the fan casing and the communication of the hopper with the first tubular member, the peripheral wall of said second tubular member being provided with openings, the outer end of said second tubular member being closed, said second tubular member being of a diameter less than that of the interior diameter of the first tubular member thus providing a space between the two tubular members.

4. In a dusting apparatus, a hopper having a discharge opening, rotating means disposed beneath said discharge opening for breaking up the material, a second rotating means cooperating with said first means in breaking up the material, and a suction fan for drawing the material through said second means.

5. In a dusting apparatus, a hopper having a discharge opening, means disposed beneath said discharge opening for initially breaking up the material, a perforated rotatable drum having one end thereof open cooperating with said means in breaking up the material, and a fan for drawing the material through said drum, the material discharging through the open end of said drum.

6. An apparatus of the class described comprising a portable body, a hopper carried thereby, a distributing fan, a perforated member, and a plurality of fingers rotatably mounted in a position to break up material discharged from the hopper, said fan upon rotation thereof drawing the dusting material through the perforations of said member.

7. An apparatus of the class described comprising a hopper having a discharge opening, a casing communicating with the opening, a fan, a shaft for the fan disposed through said casing, a perforated member mounted on the shaft and fingers rotatable with said shaft and disposed across the opening.

In testimony whereof I hereunto affix my signature.

J. M. BRASINGTON.